A. C. ROEBUCK.
OPTICAL PROJECTING APPARATUS.
APPLICATION FILED FEB. 11, 1909.

1,064,010.

Patented June 10, 1913.
3 SHEETS—SHEET 1.

Attest:
M. H. Holmes
Henry Moe

Inventor:
Alvah C. Roebuck,
by Robert Burns, Atty.

A. C. ROEBUCK.
OPTICAL PROJECTING APPARATUS.
APPLICATION FILED FEB. 11, 1909.
1,064,010.
Patented June 10, 1913.
3 SHEETS—SHEET 2.
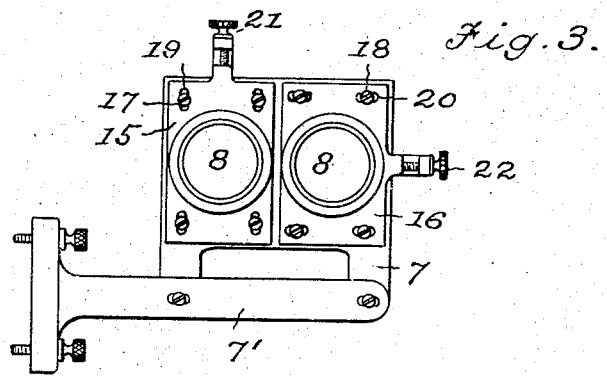
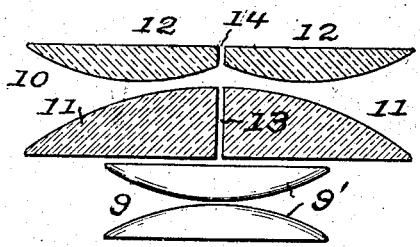
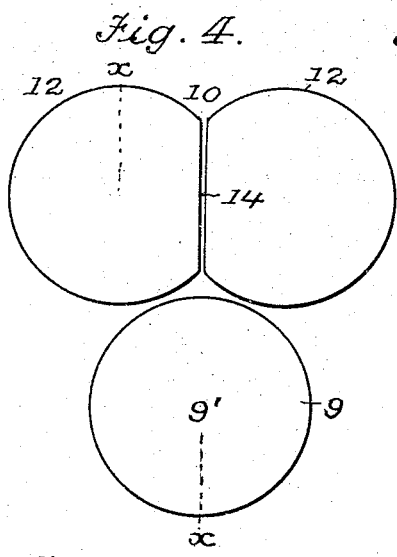
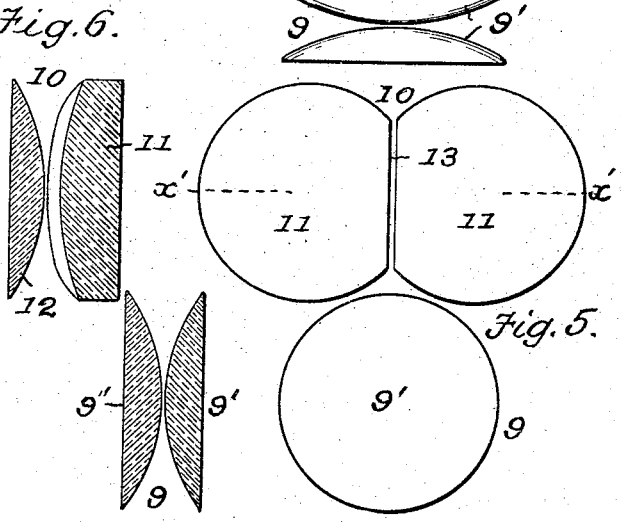
Attest:
M. H. Holmes.
Henry Moe.
Inventor:
Alvah C. Roebuck,
by Robert Burns Atty.

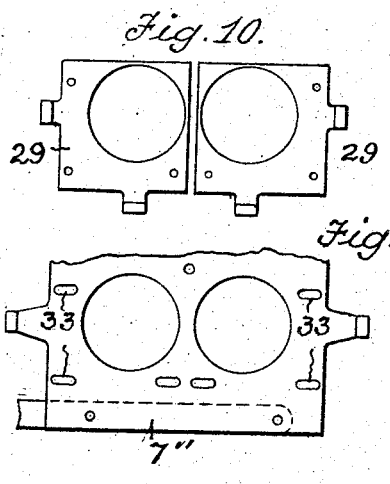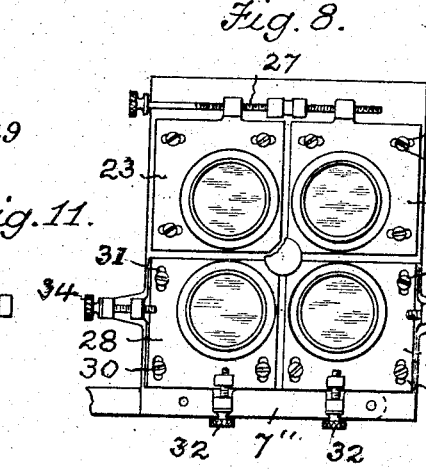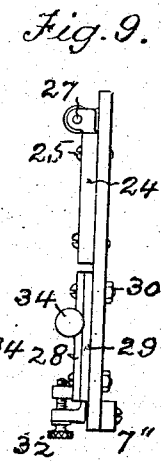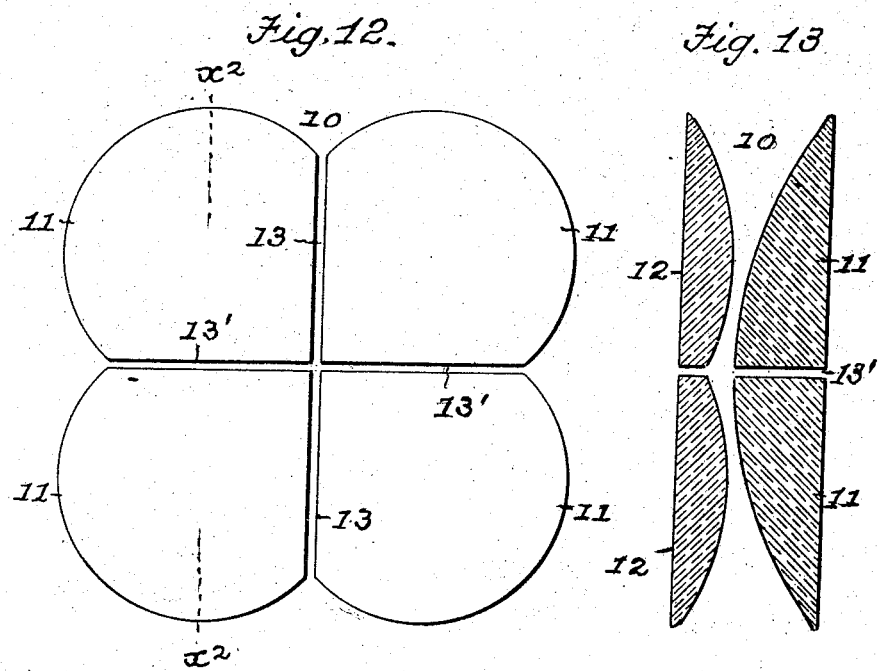

UNITED STATES PATENT OFFICE.

ALVAH C. ROEBUCK, OF CHICAGO, ILLINOIS, ASSIGNOR TO THE ENTERPRISE OPTICAL MFG. COMPANY, OF CHICAGO, ILLINOIS, A CORPORATION OF ILLINOIS.

OPTICAL PROJECTING APPARATUS.

1,064,010.   Specification of Letters Patent.   Patented June 10, 1913.

Application filed February 11, 1909. Serial No. 477,436.

*To all whom it may concern:*

Be it known that I, ALVAH C. ROEBUCK, a citizen of the United States of America, and a resident of Chicago, in the county of Cook and State of Illinois, have invented certain new and useful Improvements in Optical Projecting Apparatus, of which the following is a specification.

This invention relates to projecting apparatus, and more especially to multiple dissolving view stereopticons, and has for its objects: To provide a simple, durable and efficient construction of a stereoptican apparatus adapted to refract the light from a single source of illumination in a manner that the picture projected from each of the plurality of optical systems will appear on the same spot of the view screen to insure proper registration, and with which economy in the operation of the equipment is attained by a decrease in the breakage of the lens when using illuminants of great strength. Also to provide a structural arrangement and combination of parts whereby a double dissolving stereopticon, or a compound dissolving stereopticon composed of two stereoscopic series, are illuminated with the same illuminant used in connection with a kinetoscopic projecting apparatus; all as will hereinafter more fully appear.

Figure 1:
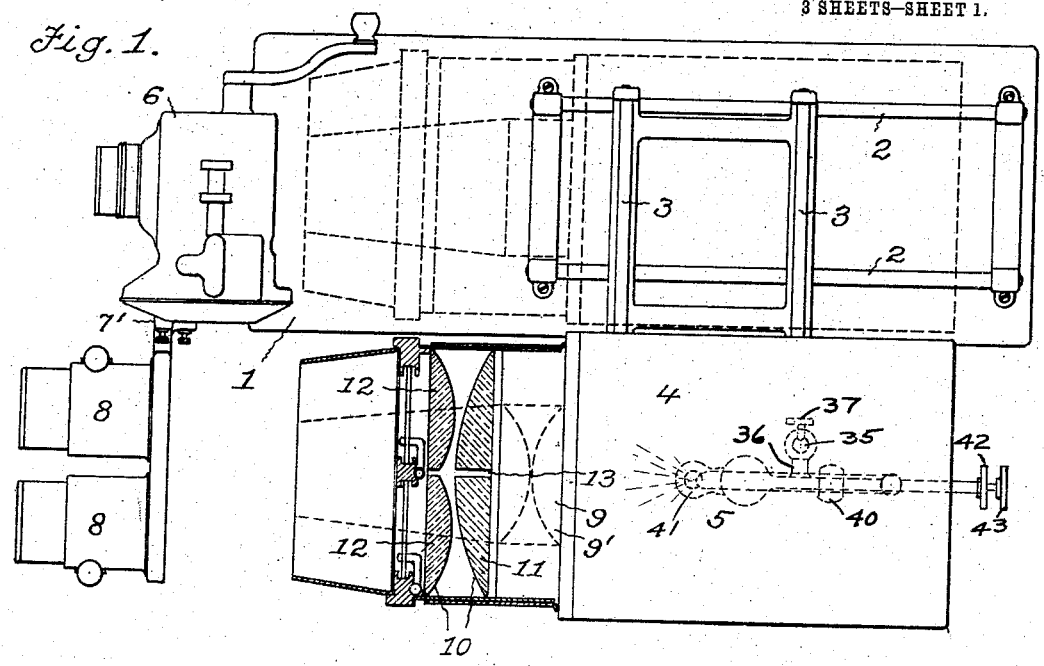
Figure 2:
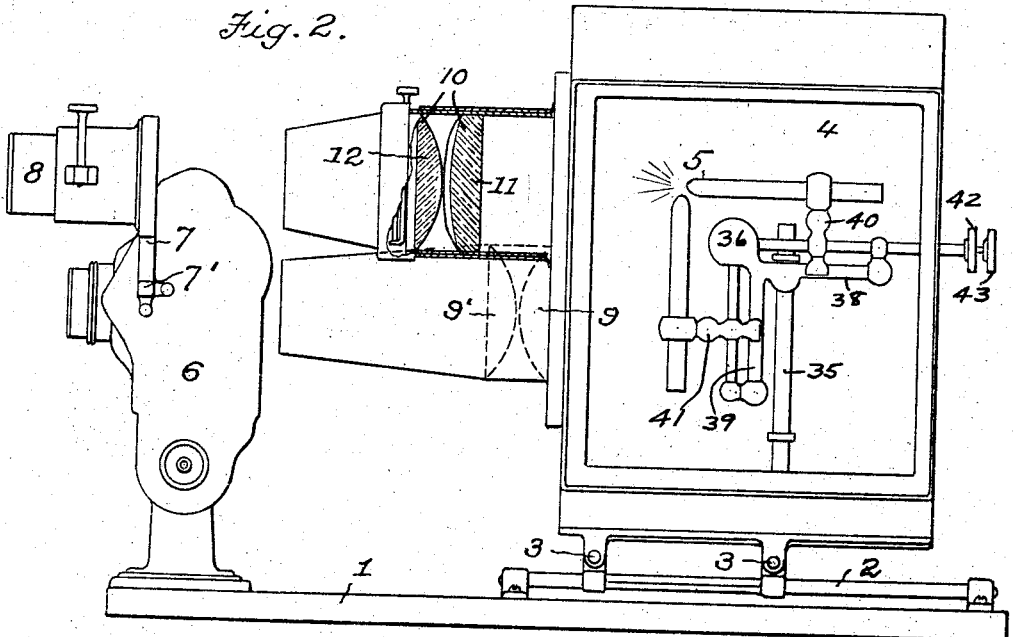

In the accompanying drawings:—Figure 1, is a plan view of a combined kinetoscope and stereopticon embodying the present invention. Fig. 2, is a side elevation of the same with parts in section. Fig. 3, is a detail front elevation of the stereopticon mount of the duplex lens type. Figs. 4 and 5, are respective front and rear elevation of the series of condensing lens of the present system as adapted to a duplex lens stereopticon. Fig. 6, is a vertical section of the same on line $x$—$x$, Fig. 4. Fig. 7, is a horizontal sectional elevation of the same on line $x'$—$x'$, Fig. 5. Fig. 8, is a front elevation of a stereopticon mount of the quadruplex type. Fig. 9, is a detail side view of the same. Fig. 10, is a detail elevation of the intermediate carrying plates of the quadruplex objectives aforesaid. Fig. 11, is a fragmentary elevation of the carrying frame for said objectives. Fig. 12, is a front elevation of the lens members of the condenser for the aforesaid quadruplex stereopticon. Fig. 13, is an axial section of the same, on line $x^2$—$x^2$, Fig. 12.

Similar numerals of reference indicate like parts in the several views.

Referring to the drawings, 2 are longitudinal tracks, preferably of the rod form shown, and which are secured to the base board 1 of the kinetoscope as illustrated in Figs. 1 and 2.

3 are secondary tracks arranged in transverse relation to the aforesaid longitudinal tracks 2, and preferably supported on said tracks and capable of longitudinal adjustment thereon.

4 is the single lamp house of the present construction, mounted on the secondary tracks 3, and capable of transverse movement thereon for the purpose hereinafter stated.

5 is an illuminating apparatus located within the lamp house in a vertically adjustable manner, and preferably of the electric arc type shown and hereinafter described in detail.

6 is a kinetoscope of any usual construction, secured to the forward end of the base board 1, aforesaid.

7 is the carrying frame of the stereopticon objective 8, preferably secured by a lateral extension 7' to the side of the kinetoscope as shown in Figs. 1, 2 and 3. The stereopticon objectives above referred to may be of the duplex type illustrated in Fig. 3, or the quadruplex or stereoscopic type illustrated in Fig. 8, as required in the varied applications of the present invention. In the present construction, the optical center of the stereopticon objective 8 is arranged in a plane above the optical center of the kinetoscope 6, so that a clear space will be provided above said kinetoscope objective and accessories, for the convenient lateral introduction and removal of the stereopticon slides during an exhibition of the same.

9 is a condenser arranged at the forward end of the lamp house 4, with its optical axis in alinement with optical axis of the kinetoscope 6, and individual thereto.

10, is a companion condenser also carried at the forward end of the lamp house aforesaid, on a plane with the stereopticon objectives aforesaid and individual thereto.

In the present improvement the condenser 9 for the kinetoscope will have the ordinary type of lens 9' shown in Figs. 6 and 7; while the condenser 10 for the stereopticon will be of the special construction now to be described:—11, are the inner group of lens members, and 12 the outer group of lens members, the spherical surfaces of which are in the usual adjacent relation, as shown. The inner group of lens members 11 comprise a planospherical lens member formed in two sections separated by a diametric gap 13, in the type of stereopticon apparatus having duplex objectives, as illustrated in Figs 3, 4, 5, 6 and 7; while in the case of a stereopticon apparatus having quadruplex objectives, said group of inner lens members will be formed of four sections separated by diametric gaps 13 and 13' in right angle relation, as illustrated in Figs. 8, 12 and 13. In my preferred construction the spherical surfaces of said sections will have a common radius as shown more particularly in Figs. 7 and 13. The companion outer group of lens members 12 also consists of a series of counterpart sections, preferably of a planospherical form, and also separated by a single gap 14, in a stereopticon apparatus having duplex objectives, as shown in Figs. 3, 5 and 7; and by a pair of gaps in right angle relation, in an apparatus having quadruplex objectives, such last mentioned gaps corresponding with the gaps 13, and 13' above described. In the condenser lens system above described, the principal point of advantage, and wherein it differs from other systems of the same class, is a very simple and efficient lens combination in which only two members are required for an individual set of condenser lenses where the older individual sets of condenser lenses required at least three. In each of the present individual set of condenser lenses, the optical center of the spherical surface of the lens section next adjacent to the source of illumination is at a point close to the edge of said section and in consequence the rays of light are bent approximately toward the optical center of the front lens member, and said front lens member receives the illumination and converges the same in its passage to an individual stereopticon objective 8. In the present construction the optical axes of the front group of condenser lens members 12, are disposed laterally outside the optical axes of the rear group of condenser lens members 11, and in alinement with the optical axes of the respective stereopticon objectives 8. As so combined the present individual sets of condenser lens members differ from the older sets of the same class in dispensing with an auxiliary prism in one instance, and with an auxiliary front condensing lens in another instance.

The present arrangement affords economy both in the purchase and operation of the equipment, and the resulting decrease in the breakage of the lens when using illuminants of great strength.

The stereopticon objectives are made adjustable on their carrying frame in order to register the pictures on the same spot on the view screen, as well as to provide for lens of different focal lengths. In the attainment of such adjustment with the duplex type of stereopticon objectives illustrated in Figs. 2 and 3, said objectives will be mounted on individual carrier plates 15 and 16, which in turn are mounted on the forward face of the carrying frame 7, aforesaid, by attaching screws 17 and 18, and elongated slots 19 and 20. The elongated slots 19 in the one plate 15 are arranged in a vertical direction, while the elongated slots 20 in the other plate 16 are arranged in a horizontal direction.

21 and 22 are adjusting screws by which limited adjustments in the directions above referred to are imparted to the respective carrier plates 15 and 16, and the objectives carried thereon.

In the quadruplex type of stereopticon objectives illustrated in Figs. 8, 9, 10 and 11, the upper pair of objectives are mounted on individual carrier plates 23 and 24, which in turn are mounted on the forward faces of the carrying frame 7" by screws 25 and horizontally elongated slots 26, and receive simultaneous adjustment in a horizontal plane by means of a right and left hand adjusting screw 27 as shown in Fig. 8. The lower pair of said objectives are mounted on individual outer carrier plates 28, which in turn are mounted on intermediate carrier plates 29, by screws 30 and vertically elongated slots 31, and receive individual vertical adjustment by means of individual adjusting screws 32.

The intermediate carrier plates are mounted in turn on the forward face of the carrying frame 7" by the aforesaid screws 30, and horizontally elongated slots 33 in said carrying frame, and receive a horizontal adjustment thereon, from the adjusting screws 34.

The arc-lamp 5 heretofore referred to as the preferred illuminating means, is of the following detail construction: 35 is a vertical pedestal secured to the floor of the lamp house 4, aforesaid. 36 is a vertically adjustable head having vertical movement on the shank portion of the pedestal 35 and adapted to be secured thereto by a set-screw 37 in proper relation to the different optical axes of the apparatus. Said head is in turn formed with a horizontal slideway 38 and a vertical slideway 39 for the carbon carriers of the lamp. 40 and 41 are the carbon carriers, mounted to slide upon the respective slideways 38 and 39, and receiving adjusting movements from the outside of the lamp house 4, by individual shafts and hand wheels 42 and 43, through any usual intermediate operative connections, common to the lighting art.

In the present construction the lamp house 4, and the vertically adjustable illuminating means arranged within said lamp house, are shifted laterally to bring the illuminating means in alinement with either the kinetoscope or the stereopticon objectives as required. And in that said objectives are arranged in different vertical planes, the vertically adjustable provision of the illuminating means is required in order that the same may be raised or lowered in accordance with its use in connection with the stereopticon or with the kinetoscope.

Having thus fully described my said invention what I claim as new and desire to secure by Letters Patent, is:—

1. In a stereopticon, the combination of a pair of stereopticon objectives and a condenser comprising a pair of inner plano-spherical lens members arranged side by side and having their optical centers adjacent to their adjoining edges, and a pair of outer lens members arranged side by side and having their optical centers in alinement with those of the stereopticon objectives respectively, substantially as set forth.

2. In a stereopticon, the combination of a pair of stereopticon objectives and a condenser comprising a pair of inner plano-spherical lens members arranged side by side and separated by a diametric gap and having their optical centers adjacent to their adjoining edges, and a pair of outer lens members arranged side by side and having their optical centers in alinement with those of the stereopticon objectives respectively, substantially as set forth.

3. In a stereopticon, the combination of a pair of stereopticon objectives and a condenser comprising a pair of inner plano-spherical lens members arranged side by side and having their optical centers adjacent to their adjoining edges, and a pair of outer plano-spherical lens members arranged side by side and having their optical centers in alinement with those of the stereopticon objectives, substantially as set forth.

4. In a stereopticon, the combination of a pair of stereopticon objectives and a condenser comprising a pair of inner plano-spherical lens members arranged side by side and separated by a diametric gap and having their optical centers adjacent to their adjoining edges, and a pair of outer plano-spherical lens members arranged side by side and having their optical centers in alinement with those of the stereopticon objectives respectively, substantially as set forth.

5. In a stereopticon, the combination of a plurality of stereopticon objectives, and a condenser comprising a plurality of inner plano-spherical lens members arranged side by side and having their optical centers adjacent to their adjoining edges, and a plurality of outer lens members having their optical centers in alinement with those of the stereopticon objectives respectively, substantially as set forth.

6. In a stereopticon, the combination of a plurality of stereopticon objectives, and a condenser comprising a plurality of inner plano-spherical lens members arranged side by side and separated by diametric gaps in right angle relation and having their optical centers adjacent to their adjoining edges, and a plurality of outer lens members having their optical centers in alinement with those of the stereopticon objectives respectively, substantially as set forth.

7. In a stereopticon, the combination of a plurality of stereopticon objectives, and a condenser comprising a plurality of inner plano-spherical lens members arranged side by side and having their optical centers adjacent to their adjoining edges, and a plurality of outer plano-spherical lens members having their optical centers in alinement with those of the stereopticon objectives, respectively, substantially as set forth.

8. In a stereopticon, the combination of a plurality of stereopticon objectives, and a condenser comprising a plurality of inner plano-spherical lens members arranged side by side and separated by diametric gaps in right angle relation and having their optical centers adjacent to their adjoining ends, and a plurality of outer plano-spherical lens members having their optical centers in alinement with those of the stereopticon objectives respectively, substantially as set forth.

9. In a stereopticon, the combination of a pair of objectives having limited adjustment to and from each other, and a condenser comprising a pair of inner plano-spherical lens members arranged side by side and having their optical centers adjacent to their adjoining edges, and a pair of outer lens members arranged side by side and having their optical centers in alinement with those of the stereopticon objectives respectively, substantially as set forth.

10. In a stereopticon, the combination of a pair of objectives having limited adjustment to and from each other, and a condenser comprising a pair of inner plano-spherical lens members arranged side by side and separated by a diametric gap and having their optical centers adjacent to their adjoining edges, and a pair of outer lens members arranged side by side and having their optical centers in alinement with those of the stereopticon objectives respectively, substantially as set forth.

11. In a stereopticon, the combination of a pair of objectives having limited adjustment to and from each other, and a condenser comprising a pair of inner planospherical lens members arranged side by side and having their optical centers adjacent to their adjoining edges, and a pair of outer plano-spherical lens members arranged side by side and having their optical centers in alinement with those of the stereopticon objectives respectively, substantially as set forth.

12. In a stereopticon, the combination of a pair of objectives having limited adjustment to and from each other, and a condenser comprising a pair of inner plano-spherical lens members arranged side by side and separated by a diametric gap and having their optical centers adjacent to their adjoining edges, and a pair of outer plano-spherical lens members arranged side by side and having their optical centers in alinement with those of the stereopticon objectives respectively, substantially as set forth.

13. In a stereopticon, the combination of a plurality of stereopticon objectives having limited adjustment to and from each other, and a condenser comprising a plurality of inner plano-spherical lens members arranged side by side and having their optical centers adjacent to their adjoining edges, and a plurality of outer lens members arranged side by side and having their optical centers in alinement with those of the stereopticon objectives respectively, substantially as set forth.

14. In a stereopticon, the combination of a plurality of stereopticon objectives having limited adjustment to and from each other, and a condenser comprising a plurality of inner plano-spherical lens members arranged side by side and separated by diametric gaps in right angle relation and having their optical centers adjacent to their adjoining edges, and a plurality of outer lens members arranged side by side and having their optical centers in alinement with those of the stereopticon objectives respectively, substantially as set forth.

15. In a stereopticon, the combination of a plurality of stereopticon objectives having limited adjustment to and from each other, and a condenser comprising a plurality of inner plano-spherical lens members arranged side by side and having their optical centers adjacent to their adjoining edges, and a plurality of outer plano-spherical lens members arranged side by side and having their optical centers in alinement with those of the stereopticon objectives respectively, substantially as set forth.

16. In a stereopticon, the combination of a plurality of stereopticon objectives having limited adjustment to and from each other, and a condenser comprising a plurality of inner plano-spherical lens members arranged side by side and separated by diametric gaps in right angle relation and having their optical centers adjacent to their adjoining edges, and a plurality of outer plano-spherical lens members arranged side by side and having their optical centers in alinement with those of the stereopticon objectives respectively, substantially as set forth.

Signed at Chicago, Illinois, this 21st day of January 1909.

ALVAH C. ROEBUCK.

Witnesses:
ANSEL M. EVANS,
ELMER E. FULTON.